United States Patent [19]

Kondo et al.

[11] Patent Number: 4,732,593
[45] Date of Patent: Mar. 22, 1988

[54] SINTERED CERAMIC FILTER STRUCTURE HAVING BODY COMPRESSIVELY STRESSED BY SINTERED CERAMIC MATERIAL HAVING DIFFERENT SINTERING SHRINKAGE RATIO

[75] Inventors: Hiroshi Kondo, Takahama; Yukihisa Takeuchi, Aichi; Hitoshi Yoshida, Okazaki; Seiki Nakagawa, Takahama, all of Japan

[73] Assignee: Nippondenso Co., Ltd., Kariya, Japan

[21] Appl. No.: 878,297

[22] Filed: Jun. 23, 1986

[30] Foreign Application Priority Data

Jun. 24, 1985 [JP] Japan ............................ 60-137152

[51] Int. Cl.⁴ .................................................. B01D 39/06
[52] U.S. Cl. ............................ 55/523; 55/DIG. 30; 60/311
[58] Field of Search ................. 55/523, DIG. 30; 264/44; 60/311

[56] References Cited

U.S. PATENT DOCUMENTS

| | | | |
|---|---|---|---|
| 4,207,371 | 6/1980 | Otto | 428/212 |
| 4,363,644 | 12/1982 | Sato et al. | 55/523 |
| 4,390,355 | 6/1983 | Hammond, Jr. et al. | 55/523 |
| 4,396,565 | 8/1983 | Tomita et al. | 264/44 |
| 4,420,316 | 12/1983 | Frost et al. | 55/523 |
| 4,436,538 | 3/1984 | Tomita et al. | 55/482 |
| 4,540,535 | 9/1985 | Tomita et al. | 264/44 |
| 4,604,869 | 8/1986 | Yoshida et al. | 55/DIG. 30 |

FOREIGN PATENT DOCUMENTS 176111 10/1982 Japan ................................ 55/523

Primary Examiner—Bernard Nozick
Attorney, Agent, or Firm—Cushman, Darby & Cushman

[57] ABSTRACT

A sintered ceramic structure for cleaning noxious substances contained in the exhaust gases emitted by an internal combustion engine is disclosed. The stucture comprises: an exhaust-gas cleaning portion including a multiplicity of pores through which the exhaust gas is discharged and an exhaust-gas inlet portion and an exhaust-gas outlet portion; an external wall portion being integrally disposed around the outer periphery of the exhaust-gas cleaning portion except for both the exhaust-gas inlet portion and the exhaust-gas outlet portion of the exhaust-gas cleaning portion; the exhaust-gas cleaning portion and the external wall portion being constituted by ceramics; and the ceramics of the external wall portion being composed of a sintered ceramic material having a sintering-shrinkage ratio smaller than that of the ceramics of the sintered ceramic material of the noxious gas cleaning portion, whereby upon sintering a residual compressive stress is imparted to the external wall portion due to the difference between the sintered-shrinkage ratios.

10 Claims, 16 Drawing Figures

SINTERED CERAMIC FILTER STRUCTURE HAVING BODY COMPRESSIVELY STRESSED BY SINTERED CERAMIC MATERIAL HAVING DIFFERENT SINTERING SHRINKAGE RATIO

BACKGROUND OF THE INVENTION

The present invention relates to a ceramic structure, and more particularly, to a ceramic structure which can be adapted for use as a particulate trapper (i.e. trap), a catalyst support for cleaning exhaust gases, or the like incorporated in a diesel engine.

For example, a conventional trapper for trapping particulates (particulate carbon) emitted by a diesel engine was disclosed in the specification of Japanese Patent Unexamined Publication No. 161962/1983.

This conventional type of trapper is constituted by porous ceramics having a three-dimensional network structure and wherein inlet ports and outlet ports are separated by a partition. An exhaust gas passes from the inlet ports through the partition to the outlet ports, and while the gas is passing through the partition, the particulates contained in the exhaust gas are trapped by the partition.

A reinforced ceramic layer has heretofore been integrally formed on the outer periphery of such a ceramic structure.

Such a conventional type of ceramic structure involves disadvantage in that the thermal shock resistance is inferior and the reinforced layer is apt to suffer from cracking.

SUMMARY OF THE INVENTION

Accordingly, the present invention aims to provide a ceramic structure having improved thermal shock resistance.

In order to study the above noted problems of the prior-art ceramic structure, the inventors conducted a thermal shock resistance test. In this test a ceramic structure for testing was first placed in a high temperature for a predetermined period of time and the ceramic structure was then cooled to room temperature. This test showed that intensive thermal tensile stress occurs in the outer periphery (skin) of the reinforced layer and, when the stress level exceeds the allowable stress level of the material used in the reinforced layer, cracks occur in the reinforced layer.

The present invention, therefore, provides a ceramic structure which includes an internal structure such as a cylindrical exhaust-gas cleaning portion having inlet ports and outlet ports, as described above, and an external structure such as the reinforced layer, and in which the external structure is constructed by a ceramic material having at the time of sintering a shrinkage ratio smaller than that of the internal structure, whereby a residual compressive stress is imparted to the external structure by virtue of a difference between the two shrinkage ratios.

In accordance with the present invention, while the ceramic material is being sintered, the internal and external structures undergo shrinkage, but the internal structure shrinks to an extent which is somewhat larger than the external structure due to the higher shrinkage ratio of the internal structure relative to the external structure. On the other hand, since the external structure formed on the periphery of the internal structure has a lower shrinkage ratio, the external structure is subjected to a compressive stress due to the shrinkage of the internal structure.

In consequence, a residual compressive stress occurs in the external structure. Thus, when a product having the ceramic structure is cooled after exposed to high temperatures, although tensile stress occurs in the external structure, the tensile stress is reduced by the previously provided residual compressive stress.

Accordingly, the present invention possesses advantage in that it is possible to reduce the tensile surface stress which acts on the external structure due to thermal shock as compared with the prior art, and the external structure does not crack even if heated at higher temperatures, thereby enabling improved thermal shock resistance.

The above and other objects, features and advantages of the present invention will become apparent from the following description of the preferred embodiments thereof, taken in conjunction with the accompanying drawings.

DESCRIPTION OF THE PREFERRED EMBODIMENTS

Description will be made below of a first embodiment of the ceramic structure of this invention which is adapted for use as a particulate trapper in a diesel engine.

Figure 1A:
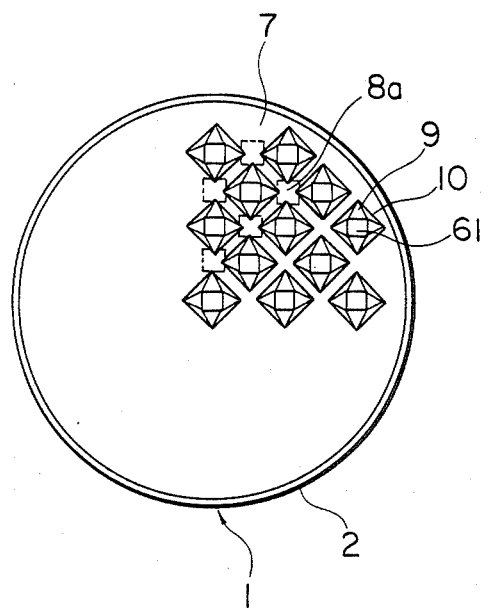
FIGS. 1A, 1B are respectively a plan view and a sectional view of a first embodiment of the ceramic structure of the present invention.
Figure 1C:
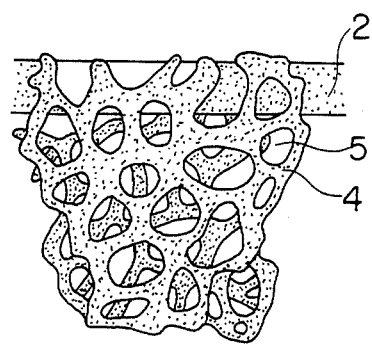
FIG. 1C is an enlarged schematic illustration showing in section the outer periphery of the first embodiment of the ceramic structure.
Figure 1B:
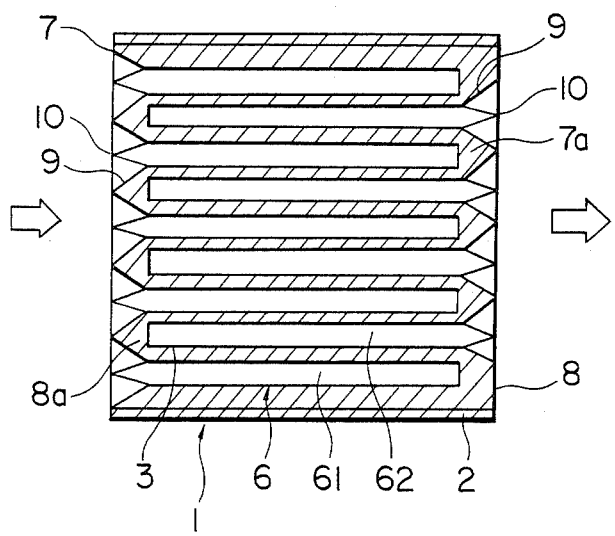

First, reference will be made to the structure of the trapper. FIG. 1A is a front view as seen when observed in the direction of the exhaust-gas inlet of a trapper 1, and FIG. 1B is a sectional view taken along the axis of the trapper 1. The trapper 1, which is made of a cordierite ceramic, is formed in the shape of a cylinder having an outer diameter of 107 mm and a length of 78 mm. Instead of this ceramic, a variety of other ceramics may also be utilized, such as SiC, Si₃N₄, Al₂O₃, and β-spondumene materials. A reinforced layer 2 is integrally formed around the outermost periphery of the trapper 1 and has a dense structure through a thickness of 2 mm. As shown in detail in FIG. 2, the interior thereof has a porous ceramic structure. More specifically, the internal structure is constituted by a skeleton 4 having a three-dimensional network structure and gas passages 5 which are formed in such a manner as to be surrounded by the skeleton 4. A total number of two hundred twenty-six hollow bores of a square section are defined in the interior of the trapper 1, and the hollow bores 6 are disposed in the form of a lattice parallel to the axis of the trapper 1, with partitions 3 interposed therebetween. Each partitions 3 has the structure shown in FIG. 2. A potion thereof porvided with the bores 6 serves as an exhaust-gas cleaning portion. The bores 6 alternately open at an end surface 7 and an end surface 8 which are on opposite sides to each other, and the other ends of the bores 6 are alternately sealed by portions 7a and 8a, respectively. In other words, the end surface 7 on the exhaust-gas inlet side has a total number of one hundred thirteen inlet ports, and the end surface 8 on the outlet side has a total number of one hundred thirteen outlet ports. The opening ratio, namely, the ratio of the total sum of the cross-sectional areas of the bores 6 with respect to the cross-sectional area of the entire trapper 1 is approximately 20%. The opening of each bore 6 has a tapered end portion 9 which diverges in such a manner that the cross-sectional area thereof gradually increases as the opening approaches the end surface 7 or 8. Each of the openings 10 in the end surfaces 7 and 8 is formed in the shape of an enlarged square which is disposed coaxially with respect to the center axis of the square section of each bore and is rotated 45 degrees about that axis. The ratio of the total sum of the areas of the openings 10 to the area of the end surfaces 7 or 8, namely, the opening ratio, is equal to or greater than 50%. As shown in FIG. 1C, the reinforced layer 2 is formed by packing a ceramic material into the gas passages 5 defined in the three-dimensional skeleton 4 which is disposed around the outer periphery of the exhaust-gas cleaning portion including the hollow bores 6. The reinforced layer 2 has a dense structure which is but slightly porous, to prevent the exhaust gas from leaking into the atmosphere.

The process of fabricating the trapper 1 will now be described. In order to obtain a trapper which has partitions of a three-dimensional network structure, an organic compound, such as a polyurethane foam having a similar three-dimensional network structure, is used as a skeletal structure, and a ceramic material is fixed to the surface of the skeleton. When the structure is sintered, the organic compound existing as the parent material is burned and decomposes, so that the ceramic material left possesses a structure similar to that of the parent material.

Figure 3A:
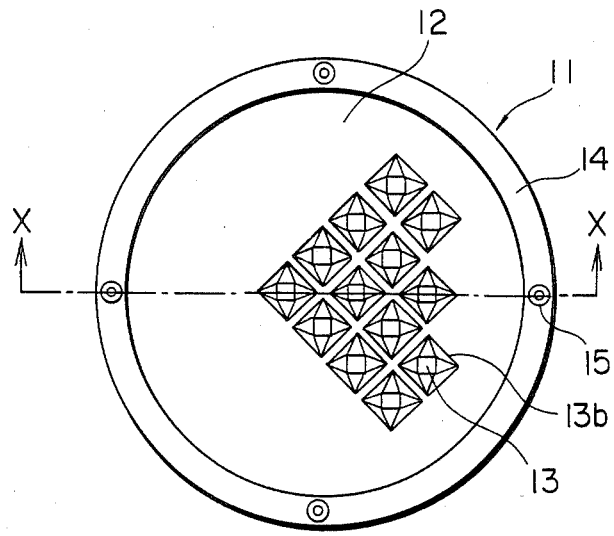
FIGS. 3A and 3B are respectively a plan view of a molding apparatus used in the fabrication of the ceramic structure shown in FIG. 1 and a sectional view taken along the line X—X.
Figure 3B:
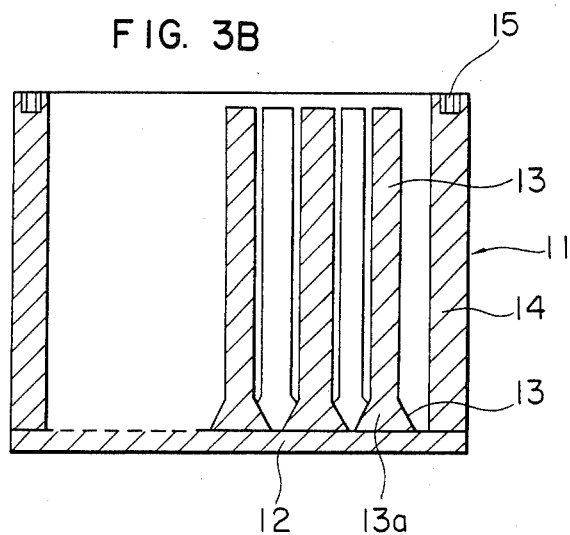

FIG. 3(A) is a plan view of the shape of a molding vessel 11 constituting a part of a mold for molding the polyurethene foam, and FIG. 3(B) is a sectional view, taken along the line X—X of FIG. 3(A). The molding vessel 11 is constituted by a base plate 12, a plurality of pillar portions 13 provided perpendicularly on the base plate 12, and a cylindrical side wall 14 which is disposed around the outer periphery of the base plate 12 in such a manner as to surround the pillar portions 13. Each of the pillar portions 13 has a square section, a lower portion 13a of each pillar portion 13 has a tapered portion 13b which diverges toward the base plate 12 so as to correspond to each opening 9 of the trapper 1, and the boundary portion between each lower portion 13a and the base plate 12 has an enlarged square section which is rotated 45 degrees about the axis of the square section of the corresponding pillar portion 13.

Figure 4A:
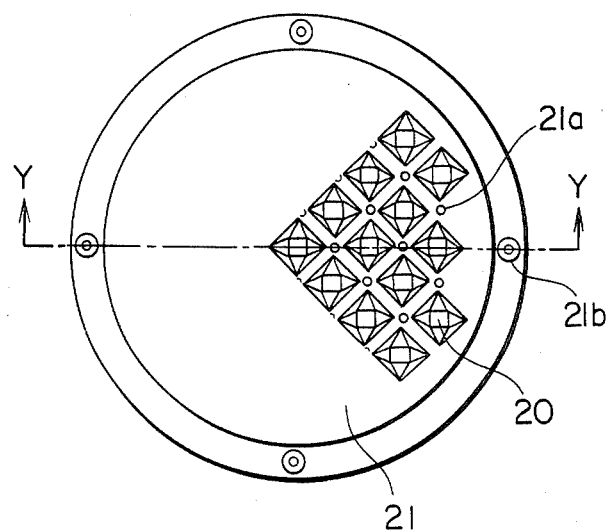
FIGS. 4A and 4B are respectively a plan view of a molding apparatus used in the fabrication of the ceramic structure shown in FIG. 1 and a sectional view taken along the line Y—Y.
Figure 4B:
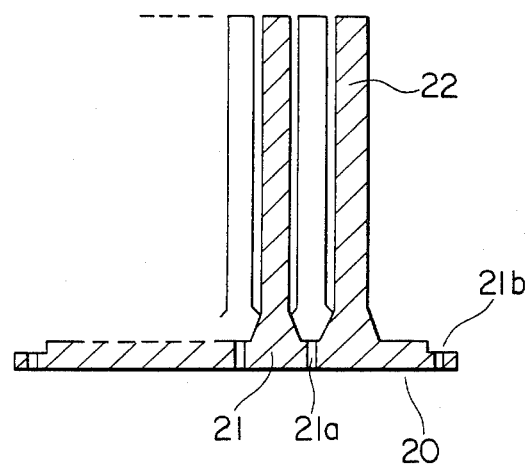

FIG. 4A is a plan view of a lid member 20 for covering the molding vessel 11, and FIG. 4B is a sectional view taken along the line Y—Y of FIG. 4A. The lid member 20 is constituted by a lid plate 21 and a plurality of pillar portions 22 provided perpendicularly on the lid plate 21. Through bores 21a are provided in the lid plate 21 in positions where they do not interfere with the pillars 22. The pillar portions 22 are disposed in such a manner that, when the vessel 11 is covered with the lid member 20, as described later, the pillar portions 22 do not interfere with the corresponding pillar portions 13 of the vessel 11. Mounting holes 21b are provided at four evenly-spaced positions around the outer periphery of the lid plate 21, in order to secure the lid member 20 to the vessel 11.

Figure 5:
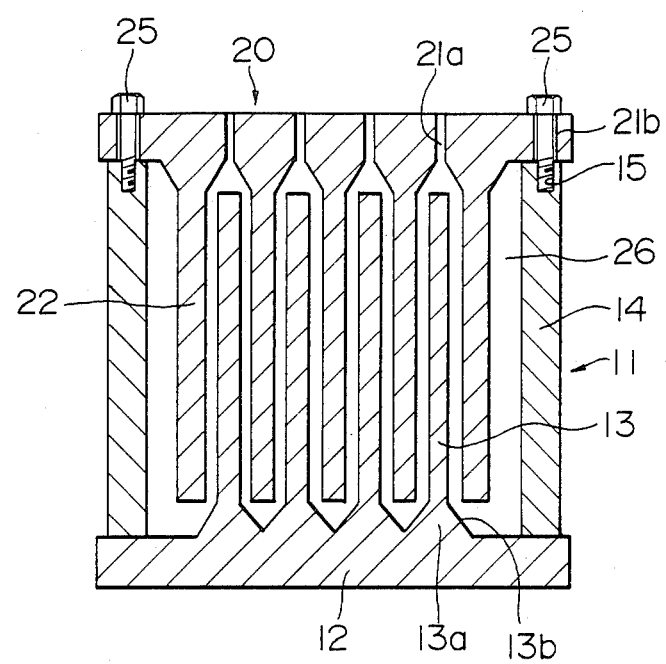
FIG. 5 is a sectional view of the molding apparatus assembled.

FIG. 5 shows the state wherein the lid member 20 is fixed to the forming vessel 11 by bolts 25, and a cavity 6 is defined by the assembly of the vessel 11 and the lid member 20.

The process of molding urethane foam will be described below. A wax-type mold release material, which was preheated to the melting point thereof or higher, was applied to the inner surface of the cavity 26 by spray or brush coating. The forming mold 11 was then warmed to a temperature of between 30° C. and 50° C. While a mixed solution of urethane-foam materials, obtained by mixing an organic isocyanate, a polyol, a foam stabilizer, a foaming agent and a catalyst, was stirred, it was poured into the molding vessel 11 and the lid member 20 was then closed. In this embodiment, a tolylenedi isocyanate, a methylenedi isocyanate or a mixture of the two isocyanates were used as the organic isocyanate. A polymeric polyol composed of a polyether polyol and/or a polyester polyol, or a mixture of a polymeric polyol and a polyether polyol were used as the polyol. Water, a halogen-substituted aliphatic hydrocarbon foaming agent (a Freon such as a trichloromonofluoro methane), or a mixture of the two materials were used as the foaming agent. An alcohol-modified silicone was used as the foam stabilizer. A tert-amine and its organic acid salt, which are commonly used as a catalyst for facilitating the reaction between an alcohol and an isocyanate, were employed as a catalyst for accelerating a resinification reaction. A morpholine and an ethanol amine, which are commonly used as a catalyst for facilitating the reaction between water and isocyanate, were employed as a catalyst for accelerating a foaming reaction. A stopper was set after the mixed solution of the urethane foam materials overflowed out of the holes 21a after it had been foamed and had pushed out the air contained in the forming mold. The thus-foamed solution was hardened by being heated to a temperature of between 100° C. and 120° C. for 20 to 60 minutes. After the hardening is completed, the vessel 11 and the lid member 20 are separated, to obtain a molded urethane foam body.

The description below details the process of fabricating a porous ceramic filter by sintering a polyurethane after the molded urethane foam body had been impregnated with a ceramic slurry. In order to obtain a raw material of the ceramic slurry used for the impregnation, binders such as a methyl cellulose and a polyvinyl alcohol and water were added to a mixed powder containing magnesium oxide (MgO), alumina ($Al_2O_3$) and silica ($SiO_2$) which forms a cordierite composition by sintering; a synthetic cordierite powder obtained by powdering a cordierite ceramic produced by heating the mixed powder; or a mixture of the two compounds. After the urethane foam had been dipped in the thus-obtained slurry, redundant slurry was removed by an air gun, a centrifugal separator, or the like, and the resultant slurry-coated urethane foam was dried in a drying oven at between 80° C. and 120° C. for two to three hours. The above-described process from impregnation to drying was repeated two or three times, until a desired quantity of ceramic slurry is fixed to the surface of the skeleton of the urethane foam body, to obtain a three-dimensional network skeleton.

Another kind of ceramic slurry is applied to provide a layer 2 nm in thickness to the outer periphery of the cylinder comprising the thus-obtained three-dimensional network skeleton, but this other kind of ceramic slurry was composed of a raw material having a shrinkage ratio which is lower by about 2.5% than that of the first slurry. This is dried in the drying oven at between 80° C. and 120° C. for two to three hours. Subsequently, sintering is effected at 1400° C. for three to six hours.

The shrinkage ratio of the ceramic material deposited on the surface of the skeleton and that of the ceramic material forming the outer periphery are controlled by, for example, varying the quantity of synthetic cordierite which is added to the starting material.

Figure 6A:
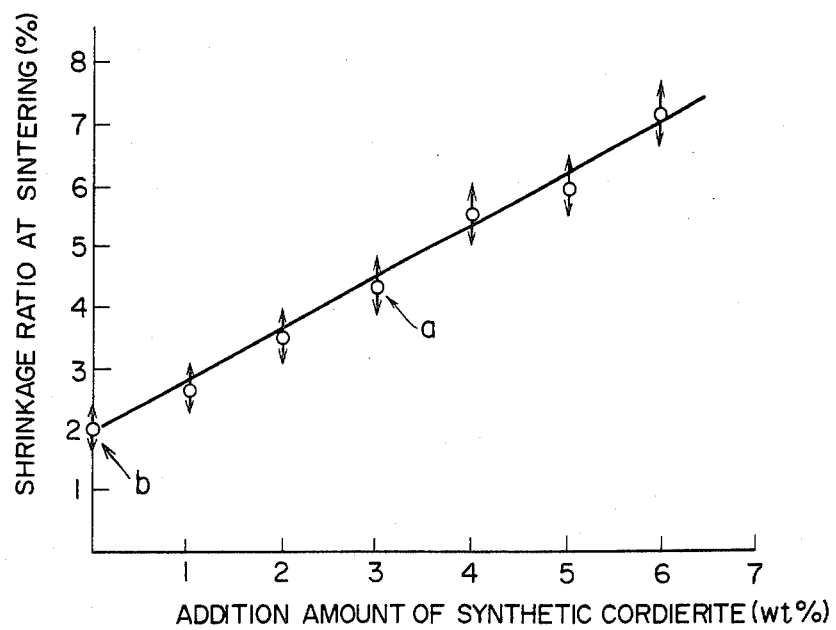
FIGS. 6A, 6B and 7 are graphs showing characteristics of the ceramic structure embodying the present invention.

FIG. 6A shows the shrinkage ratios obtained when the quantity of synthetic cordierite added to the starting material of the cordierite was varied. In this case, the sintering was effected at 400° C. for 4 hours, and a ceramic containing 3 wt % of synthetic cordierite was used for the skeleton ceramic (indicated by point a), and a ceramic containing no synthetic cordierite was used for the outer periphery (indicated by point b). The difference between the shrinkage ratios of the two ceramics was found to be 2.5%.

As will readily be understood to those skilled in the art, in the above-described trapper constituting the first embodiment, residual compressive stress is imparted to the reinforced layer by the difference between the shrinkage ratio of the three-dimensional network skeleton and that of the reinforced layer after sintering.

Measurements were made of the thermal shock resistance (a guide to thermal strength) of a trapper fabricated by the above-described process. The measurement conditions were such that the trapper to be measured was held at 550° C. for 20 minutes, was cooled in the atmosphere for 60 minutes, was held at 550° C. for 20 minutes, and was cooled for 60 minutes. The temperature was raised in a succession of increments, each of 50° C. and the process was repeated and the temperature at which cracking occurred was measured. Cracking was first observed at 750° C.

Similarly the thermal shock resistance of a trapper comprising a three-dimensional network skeleton and a reinforced layer made of the same material (whose shrinkage ratios were also the same) was also measured. Cracking was first observed at 600° C. This is due to the fact that, in a conventional type of structure, large tensile stresses occur in the reinforced layer during the cooling period, so that the ceramic of the reinforced layer cracks because it does not have a high resistance with respect to tensile stress. However, as shown by the first preferred embodiment, if residual compressive stress is left in the reinforced layer, it is possible to reduce the tensile stress occured in the reinforced layer during cooling periods, thereby improving the thermal shock resistance.

Figure 6B:
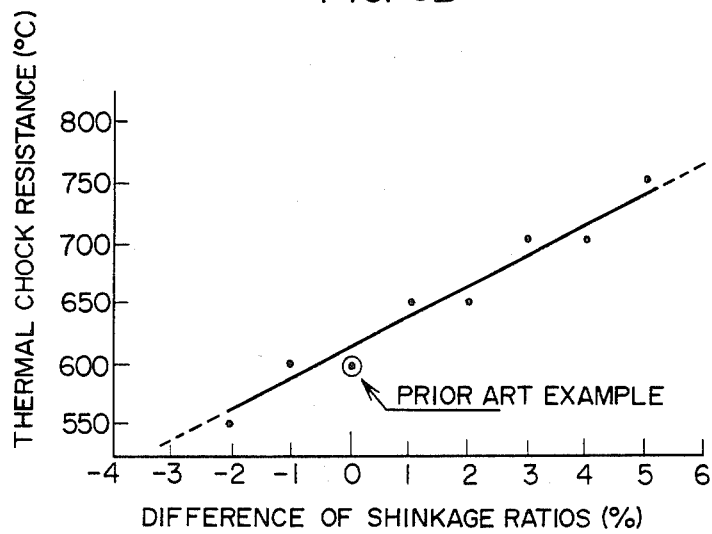

FIG. 6B is a graph showing values obtained from measurements of the thermal shock resistance of trappers made of raw materials in which the shrinkage ratio of the three-dimensional network skeleton and that of the reinforced layer are changed in various manners. In FIG. 6B, the differences between shrinkage ratios plotted along the horizontal axis are values obtained by subtracting from the shrinkage ratio of the skeleton the shrinkage ratio of the reinforced outer peripheral layer, and a difference between shrinkage ratios of 0% denotes that of the conventional structure. As is clearly shown in FIG. 6B, when the shrinkage ratio during the sintering period of the material used for the reinforced layer is made smaller than that of the trapper during the same period, thermal shock resistance is improved; that is, the thermal strength of the trapper increases.

However, if the difference between the shrinkage ratios is greater than 6%, the skeleton of the trapper portion cracks easily during calcining. Conversely, if the difference is less than 0.5%, the performance is not improved. Accordingly, the difference preferably lies between 0.5% and 6%.

Description will be made below of a second preferred embodiment of the present invention, in which $Si_3N_4$ is employed as a raw material.

Figure 7:
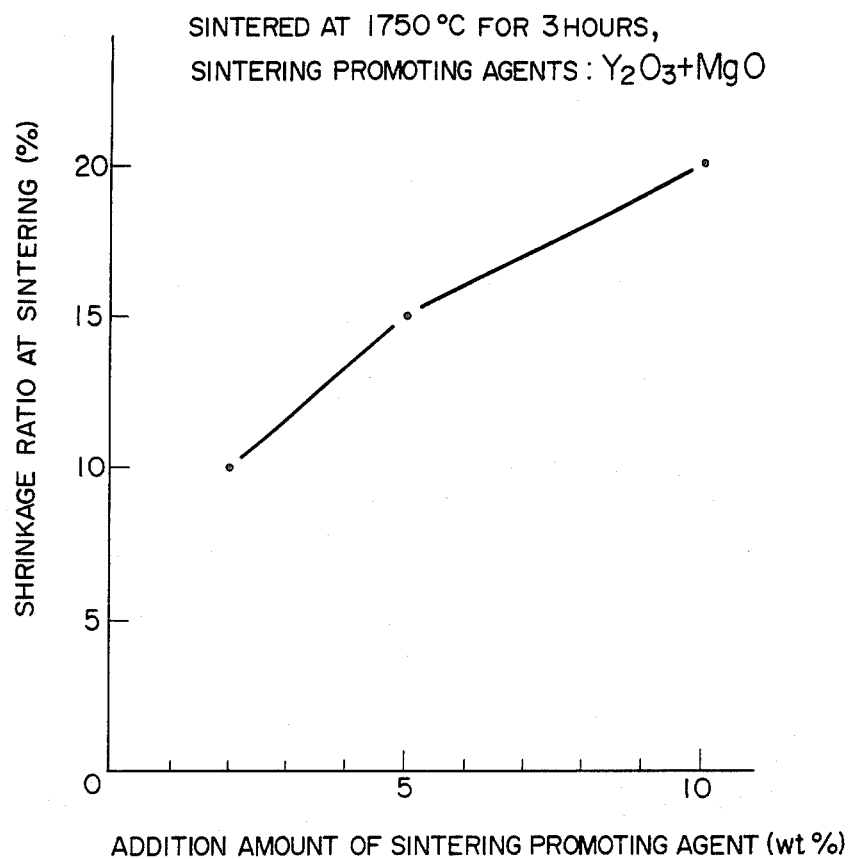

One method of varying the sintering-shrinkage ratio of a $Si_3N_4$ material is to vary the quantities of $Y_2O_3$ and MgO added as sintering-promoting agents. FIG. 7 is a graph showing the relationship between the quantity of sintering promoting agent added and sintering-shrinkage ratios. In the second embodiment, a material containing 5% of an additional sintering-promoting agent was used for the trapper portion and a material containing 2% of an additional sintering promoting agent was used for the reinforced layer. The same process as that of the first embodiment was repeated, and sintering was effected at 1750° C. for three hours. Measurements of the thermal shock resistance gave a result of 400° C. In comparison, 350° C. was the thermal shock resistance of a structure in which a material containing 5% of an additional sintering promoting agent was used as the material of both trapper portion and the reinforced layer.

As will be evident from the above results, the thermal shock resistance (the thermal strength) is successfully improved, even when using $Si_3N_4$.

The primary feature of this invention resides in a ceramic structure which is constituted by an internal structure, such as a trapper portion having a three-dimensional network skeleton, and an external structure, such as a reinforced layer; and in which the sintering-shrinkage ratio of the external structure portion is made smaller than that of the internal structure portion so that, after sintering, residual compressive stress is imparted to the external structure portion (in particular, the surface thereof), to improve the thermal strength thereof.

Various examples described of this structure are considered below.

(1) As methods of varying the shrinkage ratio:
(1)—1 Variation in the quantity of synthetic cordierite which was added.

The internal structure: 2 to 4% by weight of a synthetic cordierite was added to a cordierite composition material (to give a shrinkage ratio of 3.5 to 7.5%).

The external structure: the cordierite composition material alone (with a shrinkage ratio of 1.5%) was used.

(1)—2 Variation in the particle diameter of the powdered material.

The internal structure: the particle diameter of the cordierite composition material was made to be 5 to 10$\mu$ (to give a shrinkage ratio of 4 to 8%).

The external structure: the particle diameter of the cordierite composition material was made to be 20 to 40$\mu$ (to give a shrinkage ratio of 4 to 8%).

(1)—3 Variation in the composition of the material.

The internal structure: Ba was added to the cordierite composition material (to give a shrinkage ratio of 4 to 8%).

The external structure: the cordierite composition material alone (with a shrinkage ratio of 4 to 8%) is used.

(2) Regarding raw materials:

In addition to cordierite and $Si_3N_4$, it is also, possible to use a variety of ceramics such as SiC, $Al_2O_3$, $\beta$-spondumene composition materials, or the like.

(3) Regarding the thickness of the reinforced layer:

Although a reinforced layer of a thickness of 2 mm was formed in the previous-described embodiment, this invention is not limited to this thickness, any thickness is effective in improving the thermal strength.

(4) Regarding the reinforced layer:

The reinforced layer having been used was a single layer, but it may has a multilayer structure. In this case, the sintering-shrinkage ratio of the raw material need to be made to gradually decrease toward the outer periphery.

Figure 8A:
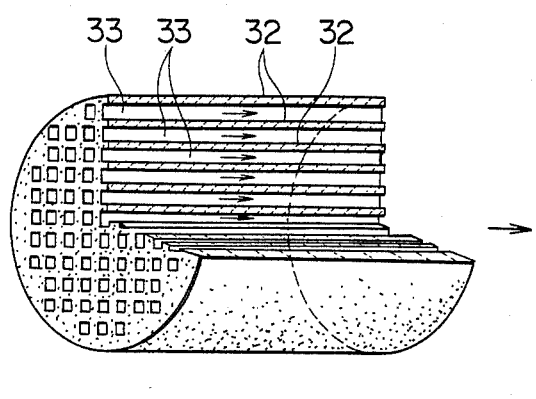
FIG. 8A is a perspective view, partially broken away, of a first embodiment of the ceramic structure of this invention which is used as a catalyst support.
Figure 8B:
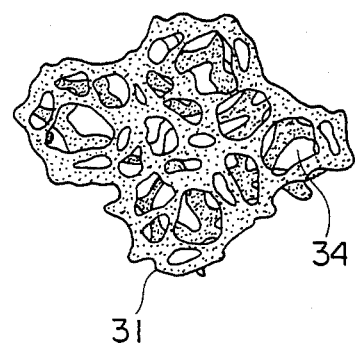
FIG. 8B is a schematic illustration showing on an enlarged scale a portion of the ceramic skeleton constituting the ceramic support.

FIGS. 8A and 8B show an example in which a ceramic structure is used as a catalyst support. The catalyst support has partitions 32 consisting of a three-dimensional network skeleton 31, in a similar manner to that of the particulate trapper shown in FIG. 1. Although the support has a cylindrical honeycomb structure as a whole, gas passages 33 therein are not closed, and a part of the exhaust gas enters the partitions 32 which contain a catalyst such as platinum.

Figure 9A:
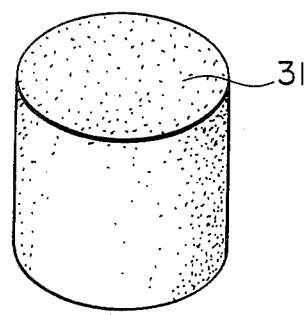
FIG. 9A is a perspective view of a second embodiment of the ceramic structure of this invention constituting a particulate trapper and FIG. 9B is a schematic illustration showing on an enlarged scale the same ceramic structure.
Figure 9B:
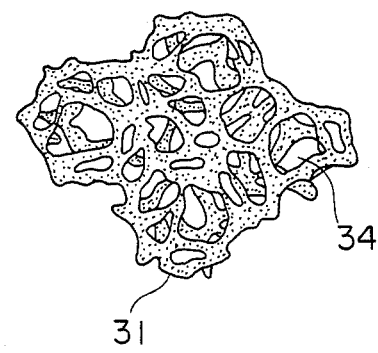

FIGS. 9A and 9B respectively show still another example of the particulate trapper. This particulate trapper has a uniform three-dimensional network skeleton 31 of a structure such that the exhaust gas can pass through the spaces defined in the skeleton and flow out of the ceramic structure.

In the above disclosure, while a variety of porous ceramic are referred to, the present invention is not limited to these ceramic structure described above.

Figure 2:
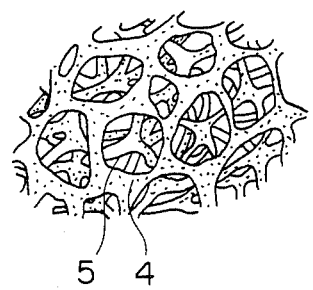
FIG. 2 is an enlarged schematic illustration of a portion of the skeleton constituting the ceramic structure shown in FIGS. 1A to 1C.

Moreover, in accordance with the present invention, a catalyst such as platinum is supported on the surface of the ceramic skeleton 4 of the partitions 3 shown in FIGS. 1A, 1B and 2, so that the skeleton 4 constitutes a catalyst support for cleaning noxious gas components such as HC, CO and $NO_X$ from the exhaust gas.

While the above provides a full and complete disclosure of the invention, various modifications, alternative constructions and equivalents may be employed without departing from the true spirit and scope of the invention. Therefore, the above description and illustrations should not be construed as limiting the scope of the invention, which is defined by the appended claims.

What is claimed is:

1. A sintered ceramic filter structure for cleaning exhaust gases emitted by an internal combustion engine, comprising:

an exhaust-gas cleaning portion formed by sintering a first ceramic material having a sintering-shrinkage ratio of a predetermined range, said exhaust-gas cleaning portion having a multiplicity of pores through which said exhaust gas passes, an exhaust-gas inlet portion, and an exhaust-gas outlet portion; and an external wall portion integrally disposed around the outer periphery of said exhaust-gas cleaning portion with the exception of both said exhaust-gas inlet portion and said exhaust-gas outlet portion of said exhaust-gas cleaning portion, said external wall portion being formed by sintering a second ceramic material having a sintering-shrinkage ratio of another predetermined range smaller than the sintering-shrinkage ratio range of the first ceramic material so that a residual compressive stress is imparted to the external wall portion due to the difference of the sintering-shrinkage ratio between said external wall portion and said exhaust-gas cleaning portion.

2. A sintered ceramic filter structure according to claim 1, wherein the difference between the sintering-shrinkage ratios of said ceramics constituting said exhaust-gas cleaning portion and said external wall portion ranges between 0.5% and 6%.

3. A sintered ceramic filter structure according to claim 1, wherein said exhaust-gas cleaning portion is composed of a first material containing one kind of composition selected from the group consisting of a cordierite composition, $Si_3N_4$, $Al_2O_3$, and $\beta$-spondumene composition, said external wall portion being composed of a second material formed by adding 2 to 4 wt % of a synthetic cordierite composition to said first material.

4. A sintered ceramic filter structure according to claim 1, wherein said exhaust-gas cleaning portion is composed of a first material having a particle diameter of 5 to 10$\mu$ and containing one kind of composition selected from the group consisting of a cordierite composition, $Si_3N_4$, $Al_2O_3$, a $\beta$-spondumene composition, said external wall portion being composed of a second material consisting of said one kind but having a particle diameter of 20 to 40$\mu$.

5. A sintered ceramic filter structure according to claim 1, wherein said exhaust-gas cleaning portion is composed of a first material in which Ba is added to one kind of composition which is selected from the group consisting of a cordierite composition, $Si_3N_4$, $Al_2O_3$, and a $\beta$-spondumene composition, and said external wall portion is composed of a second material of only said one kind.

6. A sintered ceramic filter struture according to claim 1, wherein said exhaust gas portion has inlet ports and outlet ports one pair of which inlet and outlet ports is adjacent each other, and partitions disposed between each of said inlet ports and each of said outlet ports, said partitions including a multiplicity of pores through which exhaust gas passes, one end of each of said respective inlet ports opening into said inlet portion of said exhaust-gas cleaning portion and the other end thereof being closed at said outlet portion, one end of each of said respective outlet ports being closed in said inlet portion of said exhaust-gas cleaning portion and the other end thereof opening into said outlet portion, whereby the exhaust gas passing said inlet ports is discharged out of said outlet ports through a multiplicity of said partitions.

7. A sintered ceramic filter structure according to claim 6, wherein the difference between the sintering-shrinkage ratios of said ceramics constituting said exhaust-gas cleaning portion and said external wall portion ranges between 0.5% and 6%.

8. A sintered ceramic filter structure for cleaning exhaust gases emitted by an internal combustion engine, comprising:
   a first body of ceramic material having an inlet end and an outlet end and an outer perimetrical sidewall extending longitudinally between said inlet end and said outlet end;
   a first plurality of longitudinal bores in said first body, opening through said inlet end of said first body and extending towards but terminating short of said outlet end of said first body;
   a second plurality of longitudinal bores in said first body, opening through said outlet end of said first body and extending towards but terminating short of said inlet end of said first body;
   said first and second pluralities of longitudinal bores being longitudinally coextensive with one another within a longitudinally intermediate region of said first body;
   said first body being so porous that a gas introduced into said first body through said first plurality of bores at said inlet end, may flow transversally of said first body, through pores thereof in said longitudinally intermediate section, into said second plurality of bores, and out of said outlet end of said first body, all while being cleaned in said first body;
   a second body of ceramic material extending between said inlet and outlet ends of said first body as an integral wrapper of said outer perimetrical sidewall of said first body, which wrapper is at least partially infiltrated to a desired depth in said pores of said first body, which depth is laterally short of said first and second pluralities of longitudinal bores;
   said first body of ceramic body being made of a first ceramic material having a first sintering shrinkage ratio;
   said second body of ceramic body being made of a second ceramic material having a second sintering shrinkage ratio;
   said second sintering shrinkage ratio being smaller than said first sintering shrinkage ratio;
   said first and second bodies of ceramic material being sintered; and
   said first body of ceramic material compressively stressing said second body of ceramic material due to said smaller sintering shrinkage ratio of said second ceramic material.

9. A sintered ceramic filter structure for cleaning exhaust gases emitted by an internal combustion engine, comprising:
   a first body of ceramic material having an inlet end and an outlet end, and an outer perimetrical sidewall extending longitudinally between said inlet end and said outlet end;
   a plurality of longitudinal bores in said first body, communicating within said first body between said inlet end and said outlet end;
   said first body being characterized by an open porous structure;
   a second body of ceramic material extending between said inlet and outlet ends of said first body as an integral wrapper of said outer perimetrical sidewall of said first body, which wrapper is at least partially infiltrated to a desired depth in said pores of said first body, which depth is laterally short of said plurality of longitidinal bores;
   said first body of ceramic body being made of a first ceramic material having a first sintering shrinkage ratio;
   said second body of ceramic body being made of a second ceramic material having a second sintering shrinkage ratio;
   said second sintering shrinkage ratio being smaller than said first sintering shrinkage ratio;
   said first and second bodies of ceramic material being sintered; and
   said first body of ceramic material compressively stressing said second body of ceramic material due to said smaller sintering shrinkage ratio of said second ceramic material.

10. The sintered ceramic filter structure of claim 9, wherein:
   said first and second ceramic materials are both multi-component materials and both contain the same components, but in different proportions as to at least one such component.

* * * * *